United States Patent [19]

Itoh et al.

[11] Patent Number: 5,427,600
[45] Date of Patent: Jun. 27, 1995

[54] LOW ALLOY SINTERED STEEL AND METHOD OF PREPARING THE SAME

[75] Inventors: Yoshiaki Itoh; Kozo Ito; Yoshinobu Takeda, all of Hyogo, Japan

[73] Assignee: Sumitomo Electric Industries, Ltd., Osaka, Japan

[21] Appl. No.: 159,808

[22] Filed: Nov. 30, 1993

[30] Foreign Application Priority Data

Nov. 30, 1992 [JP] Japan .................. 4-343145

[51] Int. Cl.$^6$ .................. C22C 9/12; B22F 1/00
[52] U.S. Cl. .................. 75/232; 75/235; 75/236; 75/243; 75/244; 75/246; 419/11; 419/13; 419/14; 419/19; 419/29; 419/31; 419/32; 419/33; 419/38
[58] Field of Search .................. 75/232, 235, 236, 243, 75/244, 246; 419/10, 11, 13, 14, 19, 29, 31–33, 38

[56] References Cited

U.S. PATENT DOCUMENTS

| | | | |
|---|---|---|---|
| 3,816,081 | 6/1974 | Hale | 29/182.7 |
| 3,859,086 | 1/1975 | Church et al. | 75/211 |
| 3,887,402 | 6/1975 | Kondo et al. | 148/126 |
| 3,900,309 | 8/1975 | Chao et al. | 75/0.5 BA |
| 4,066,449 | 1/1978 | Havel | 75/211 |
| 4,121,927 | 10/1978 | Lohman et al. | 75/201 |
| 4,318,733 | 3/1982 | Ray et al. | 75/0.5 BA |
| 4,519,839 | 5/1985 | Toyoaki et al. | 75/242 |
| 4,556,424 | 12/1985 | Viswanadham | 75/240 |
| 4,585,619 | 4/1986 | Westin | 419/28 |
| 4,647,304 | 3/1987 | Petkovic-Luton et al. | 75/0.5 R |
| 4,693,864 | 9/1987 | Lloyd | 419/23 |
| 4,705,565 | 11/1987 | Beltz et al. | 75/235 |
| 4,799,955 | 1/1989 | McClellan | 75/247 |
| 5,126,104 | 6/1992 | Anand et al. | 419/12 |
| 5,273,570 | 12/1993 | Sato et al. | 75/231 |

FOREIGN PATENT DOCUMENTS

| | | |
|---|---|---|
| 2555679 | 7/1976 | Germany . |
| 57-8841 | 2/1982 | Japan . |
| 2065700 | 7/1981 | United Kingdom . |
| 2219004 | 11/1989 | United Kingdom . |

*Primary Examiner*—Ngoclan T. Mai
*Attorney, Agent, or Firm*—W. G. Fasse; W. F. Fasse

[57] ABSTRACT

A low alloy sintered steel contains at least 0.15 percent by weight and less than 0.8 percent by weight of carbon. Its matrix is formed by a tempered martensite containing prior austenite crystal grains of not more than 15 μm in mean grain size. Pores and nonmetallic inclusions contained in the matrix are not more than 50 μm in maximum diameter, and the density of the low alloy sintered steel is at least 96 percent of theoretical density. A raw material powder for forming the low alloy sintered steel includes iron alloy powder which is prepared by an atomizing process, and is treated with a dry mill in an inert gas atmosphere or in the atmospheric air. Thus, dislocations are introduced into the raw material powder, and nonmetallic inclusions contained in the raw material powder are pulverized to be not more than 50 μm in maximum diameter. Not only static characteristics but also dynamic characteristics, such as fatigue strength, of the low alloy sintered steel are improved.

17 Claims, 3 Drawing Sheets

LOW ALLOY SINTERED STEEL AND METHOD OF PREPARING THE SAME

BACKGROUND OF THE INVENTION

1. Field of the Invention

The present invention relates to a low alloy sintered steel for application to a machine structural part such as gear or a race of a bearing which must have high fatigue strength, and a method of preparing the same.

BACKGROUND INFORMATION

Sintered machine parts of low alloy sintered steels which are prepared by powder metallurgy are widely used for automobile parts, business equipment, household electric products, agricultural instruments and the like due to superior economic properties. The demand for such sintered machine parts is increasing year by year. With such an increase of the demand, the low alloy sintered steels are increasingly required to have very particular characteristics.

Various studies have been constructed to satisfy such requirements. As to compositions of the low alloy sintered steels Fe—Ni—Mo—C, Fe—Ni—Cu—Mo—C and Fe—Cr—Mn—Mo—C low alloy sintered steels, for example, have been developed in addition to conventional Fe—Ni—C and Fe—Cu—C steels. As to raw material powder for the low alloy sintered steels, on the other hand, atomized powder which can achieve an improvement in the density of sintered bodies is now taking the place of reduced powder that has been generally employed.

The strength of a low alloy sintered steel has been remarkably improved by such technical developments. Static characteristics of the low alloy sintered steel, which are represented by tensile strength for example, are now approaching those of general steels for machine structural use, which are prepared by forging an I/M (Ingot Metallurgy) material. However, low alloy sintered steel is yet insufficient in dynamic characteristics, for example represented by toughness and fatigue strength. In order to satisfy the requirement for characteristic improvement and further widen the range of application of low alloy sintered steel, therefore, it is necessary to improve the dynamic characteristics.

The most effective method for improving dynamic characteristics of a low alloy sintered steel prepared by powder metallurgy is to increase its density and reduce pores left in its interior. Powder forging is a generally known method of increasing the density of a sintered steel. However, the dynamic characteristics of a low alloy steel which is prepared by powder forging cannot exceed those of a general steel for machine structural use which is prepared with the same composition by forging an I/M material. The causes for such a disadvantage are that an oxide film, which is formed on the surface of steel powder, hinders the progress of sintering and causes segregation of alloying elements, that a difference between the contents of nonmetallic inclusions results from the difference in steel producing technique between I/M and P/M (Powder Metallurgy) methods, and that pores are left on a surface layer of a forged body. Japanese Patent Publication No. 57-8841 (1982) describes a method of separating and removing an oxide film which is formed on the surface of steel powder by mechanical pulverization. According to this method, however, it is impossible to remove nonmetallic inclusions which are also present in the steel powder particles, although the oxide film provided on the surface of the powder can be removed.

SUMMARY OF THE INVENTION

An object of the present invention is to provide a low alloy sintered steel which has remarkably improved dynamic characteristics such as fatigue strength in addition to excellent static characteristics, and a method of preparing the same.

A low alloy sintered steel according to an aspect of the present invention contains at least 0.15 percent by weight and less than 0.8 percent by weight of carbon. The matrix of this low alloy sintered steel is formed by a tempered martensite containing prior austenite crystal grains of not more than 15 $\mu$m in mean grain size. Pores and nonmetallic inclusions contained in the matrix are not more than 50 $\mu$m in maximum diameter. The density of the low alloy sintered steel is at least 96 percent of theoretical density.

In a method of preparing a low alloy sintered steel according to another aspect of the present invention, raw powder containing at least either one of iron powder and iron alloy powder prepared by an atomizing process is created in an inert gas atmosphere or in the atmospheric air by a dry mill so that dislocations are introduced into the raw material powder and nonmetallic inclusions contained in the raw material powder are pulverized to not more than 50 $\mu$m in maximum diameter. The treated raw material powder is softened by being annealed. Carbon powder is added and mixed to the softened and annealed raw material powder so that the carbon content is at least 0.15 percent by weight and less than 0.8 percent by weight in the final composition. The mixed powder is cold-formed into a compact. This compact is densified by sintering or hot plastic working to have a density of at least 96 percent of theoretical density. The densified compact is heat-treated to provide a low alloy sintered steel having a matrix of a tempered martensite.

The term "low alloy sintered steel" herein employed indicates a generally known carbon steel of iron and carbon or a generally known low alloy steel of iron, carbon and other alloying elements, which is obtained by sintering raw material powder. On the other hand, the term "prior austenite crystal grains" indicates crystal grains, contained in the low alloy sintered steel, which have been austenite crystal grains in an austenite phase before quenching. In general, crystal grain sizes of quench hardened steels are compared as to the grain sizes of such prior austenite crystal grains after martensitic transformation.

The fatigue strength of a steel, which is generally improved with an increase in hardness, reaches a substantially constant level or is reduced when the hardness reaches and exceeds a certain level, due to the presence of nonmetallic inclusions. Improvement of the fatigue strength is conceivably curtailed since small inclusions, which cannot form starting points at a low hardness level, define starting points of fatigue cracks as the hardness is increased. Therefore, it is expected to be possible to remarkably improve the fatigue strength of a material which contains no inclusions, while it is difficult to industrially obtain such a material.

It is known that the fatigue life depends on the crack propagation rate at a high hardness level where the increase of fatigue strength is stopped. However, the crack propagation rate is remarkably reduced in the vicinity of grain boundaries. Therefore, it may be possible to attain an improvement of fatigue strength when a structure containing a number of grain boundaries is achieved. From such a point of view, the present invention is adapted to improve dynamic characteristics of the low alloy sintered steel such as fatigue strength, by reducing pores for improving the density of the steel while increasing grain boundaries by preparing the matrix from a particularly fine tempered martensite and minimizing the sizes of the pores and nonmetallic inclusions.

According to the present invention, the matrix of the low alloy sintered steel is formed by a fine martensite containing prior austenite crystal grains of not more than 15 $\mu$m in mean grain size. In order to obtain such a particularly fine martensite, it is necessary to refine the austenite before quenching. An exemplary method therefor is thermo-mechanical treatment such as ausforming, in a general low alloy steel which is prepared by forging an I/M material. In the present invention employing powder metallurgy, on the other hand, it has been proved by the inventors that the most effective means is to treat the raw material powder in an inert gas atmosphere or in the atmospheric air with a dry mill such as a ball mill, a vibration mill or an attoritor for a long time, for previously introducing a large number of dislocations into the raw material powder. Namely, a large number of dislocations are thus introduced into the raw material powder to refine the austenite before quenching, thereby obtaining a fine tempered martensite.

Further, it is possible to pulverize and refine nonmetallic inclusions contained in the raw material powder by the aforementioned treatment with the dry mill, thereby reducing large inclusions which are harmful for the fatigue strength. In other words, it has been proved to be possible to remarkably reduce the influence exerted by the nonmetallic inclusions on the fatigue strength of the low alloy sintered steel by reducing the maximum diameter thereof below 50 $\mu$m, preferably below 25 $\mu$m.

The hardness of the powder which is treated with a dry mill is increased due to introduction of a large number or amount of dislocations. Therefore, it is difficult to cold-form the powder treated as such. Therefore, it is necessary to soften the treated powder by annealing it, thereby improving its compressibility. The annealing step is preferably carried out in a vacuum or in a non-oxidizing atmosphere at a temperature of at least 600° C. and not more than 1000° C.. If the annealing temperature is less than 600° C., the compressibility cannot be improved since the strain is insufficiently removed and the powder is softened merely to a small degree. When the annealing temperature exceeds 1000° C., on the other hand, sintering progresses between particles of the powder so that the powder cannot be cold-formed unless pulverization is again carried out.

Carbon powder is mixed into the obtained treated powder, to adjust the content of carbon. Carbon is an important alloying element which controls the characteristics of the steel. As the carbon content is increased, the steel is increased in strength and hardness, and reduced in ductility. If the carbon content is less than 0.15 percent by weight, it is impossible to obtain excellent hardness after heat treatment. If the carbon content exceeds 0.8 percent by weight, on the other hand, the hardness is only slightly further improved while the fatigue strength is rather reduced by the increase of retained austenite. Therefore, the carbon content of the low alloy sintered steel according to the present invention is in a range of at least 0.15 percent by weight and less than 0.8 percent by weight.

The mixed powder obtained by adding and mixing carbon powder to the treated powder is cold-formed by a uniaxial press or through cold isostatic pressing (CIP), and thereafter densified to at least 96 percent of the theoretical density by hot plastic working such as sintering or hot forging, hot extrusion, hot isotropic isostatic pressing (HIP) or the like at a temperature exceeding an $A_3$ transformation point. After sintering, working such as repressing, hot forging, hot extrusion or HIP is preferably performed in order to dissipate residual pores. The pores, which exert a great influence on fatigue strength, can be regarded as equivalent to inclusions. Therefore, the maximum diameter of such pores must also be not more than 50 $\mu$m, preferably not more than 25 $\mu$m, similarly to the nonmetallic inclusions. The amount of residual pores is preferably not more than 4 percent by volume.

When the treated powder containing a large amount of dislocations introduced by a dry mill is exposed to a high temperature in a densifying step of sintering or hot plastic working, the crystal grains are easily increased in diameter. In an effective method of preventing this, fine particles are homogeneously dispersed to pin migration of the grain boundaries. Such dispersed particles are effectively prepared from an oxide, a nitride or a carbide which is not solidly solved in the matrix in a high-temperature austenite phase or has low solid solubility, such as alumina or aluminum nitride, for example. The mean grain size of such dispersed particles is not more than 0.5 $\mu$m, preferably not more than 0.1 $\mu$m. If the mean grain size of the dispersed particles exceeds 0.5 $\mu$m, the dispersed particles themselves serve as sources of fatigue cracks. Furthermore, ductility is reduced if the amount of the dispersed particles is increased. Therefore, the dispersed particles are properly added in an amount of at least 0.5 percent by volume and not more than 5 percent by volume with respect to the treated powder.

The obtained sintered body or hot plastic worked body is reinforced by ordinary heat treatment through transformation from an austenite to a martensite, thereby forming the inventive fine tempered low alloy sintered steel. In more concrete terms, the sintered body or the hot plastic worked body is heated to and held at the austenite phase, oil-quenched and thereafter tempered. It is also effective to perform carburization, carbonitriding, nitriding, surface hardening by induction heating or the like in combination with the heat treatment.

The low alloy sintered steel according to the present invention may have the composition of a well-known carbon steel or low alloy steel, as hereinabove described. However, the present invention employing powder metallurgy has a preferable alloy composition due to its process restriction. Examples of such a preferable alloy composition are Fe—Ni—Mo—C and Fe—Cr—Mo—Mn—C. An Fe—Cr—Mo—Mn—C low alloy sintered steel is superior in hardenability to an Fe—Ni—Mo—C low alloy sintered steel, but it is sensitive to the heating atmosphere for sintering or forging, due to the metal elements such as Cr and Mn which are easily oxidized. Therefore, selection and control of the atmosphere for powder treatment and heating are important.

In the aforementioned alloy composition, Ni remarkably improves hardenability, while this effect cannot be attained if the Ni content is less than 0.5 percent by weight. When the Ni content exceeds 3 percent by weight, on the other hand, it is difficult to cold-form the powder and retained austenite is increased after heat treatment, whereby it harmfully influences the fatigue strength. On the other hand, a small amount of Mo improves the hardenability, and forms a carbide with carbon to improve the wear resistance and heat resistance. However, these effects cannot be attained if the Mo content is less than 0.1 percent by weight, while the compressibility is deteriorated by solid-solution hardening if the Mo content exceeds 1.5 percent by weight. Furthermore, Cr has the functions of remarkably improving the hardenability and increasing the temper softening resistance. However, the effect of improving the hardenability cannot be attained if the Cr content is less than 0.5 percent by weight, while the compressibility is reduced by solid-solution hardening if the Cr content exceeds 3 percent by weight. In addition, Mn improves the hardenability and acts as a deoxidizer and a desulfurizer in preparation of the powder, to reduce the oxygen content in the powder. However, the effect of improving the hardenability cannot be attained if the Fin content is less than 0.2 percent by weight, while the compressibility is deteriorated by solid-solution hardening if the Mn content exceeds 1.6 percent by weight.

While grain growth at a high temperature can be effectively suppressed by pinning through dispersed particles as hereinabove described, it is also effective to add an element forming a carbide or a nitride having low solid solubility in an austenite phase to the raw material alloy powder. According to this method, it is possible to suppress the growth of crystal grains in austenitizing, thereby further refining the grain sizes of the prior austenite crystal grains. Such an element is preferably niobium, vanadium, titanium, tungsten or aluminum, and is preferably added in an amount of at least 0.05 percent by weight and not more than 3.0 percent by weight in total. The effect of suppressing the growth of crystal grains cannot be attained if the amount is less than 0.05 percent by weight, while the crystal grains are no longer refined and the compressibility of the powder is rather reduced by solid-solution hardening if the amount exceeds 3.0 percent by weight.

In the inventive low alloy sintered steel, the crystal grains are so extremely reduced that the grain boundaries are increased. Therefore, nuclei of transformation are increased to facilitate transformation from $\gamma$ (austenite) to $\alpha$ (ferrite)+$Fe_3C$ (cementire), leading to a deterioration of the hardenability. However, boron can reduce the effect of the grain boundaries serving as nucleation sites by segregating in the austenite grain boundaries and reducing the energy thereof. Thus, it is possible to improve the hardenability by adding a small amount of boron. In order to attain this effect, it is necessary to add at least 10 ppm of boron in weight fraction. If the amount of boron exceeds 300 ppm, however, the improvement of the hardenability can no longer be attained and the steel is embrittled due to a reduction in strength of the grain boundaries.

According to the present invention, as hereinabove described, it is possible to provide a low alloy sintered steel which is excellent not only in static characteristics but also in dynamic characteristics such as fatigue strength and toughness. Thus, the inventive low alloy sintered body is particularly useful as a machine structural part such as a gear or a clutch part that must have high fatigue strength. It is also expected that the inventive sintered steel can be used in applications in which no such low alloy sintered steel has yet been employed in general.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

EXAMPLE 1

Figure 1:
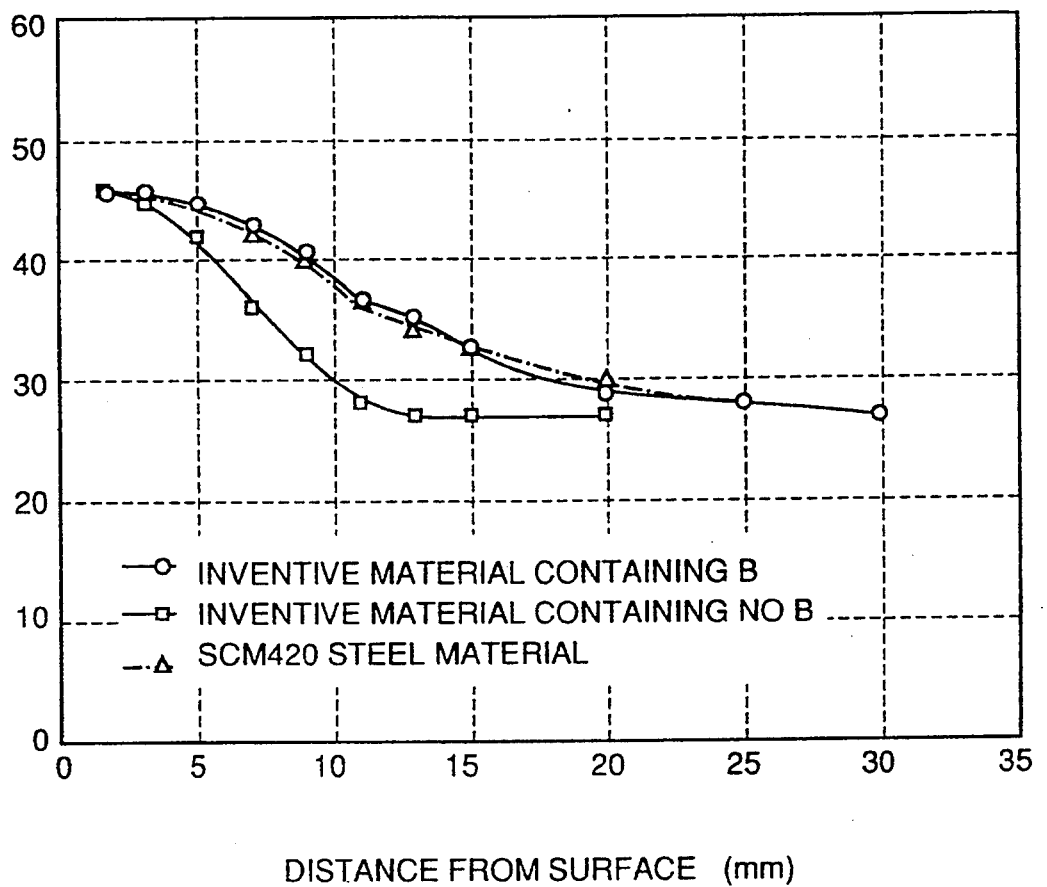
FIG. 1 is a graph showing the Rockwell C hardness relative to distance from the surface, as obtained by a Jominy test on an inventive material containing boron, another inventive material containing no boron and an SCM420 steel material.

Commercially available iron alloy powder materials prepared by a water atomizing process to have AISI4600 compositions (Fe—1.8 wt. % Ni—0.5 wt. % Mo) were treated with a high energy dry mill in an argon atmosphere at various treatment times of 2, 3, 4, 20, 40 and 80 hours. Each of the treated powder materials was heated in a nitrogen atmosphere at a temperature of 800° C. for 1 hour to be annealed and thus softened. Then graphite powder was added and mixed with the treated powder so that the carbon content was 0.25 percent by weight in the final composition. Thereafter each treated powder was cold-formed by a die press so that the green density was 6.9 g/cm$^3$ (density ratio of 0.878 relative to theoretical density). Each of the compacts was sintered in nitrogen at a temperature of 1150° C. for 1 hour, and further forged at this temperature, to obtain a forged body having a density ratio of at least 0.99 relative to the theoretical density.

Each forged body was carburized at a temperature of 910° C. so that an effective case depth was 1 mm, then held at a temperature of 850° C., thereafter quenched in oil, and tempered at a temperature of 200° C. for 90 minutes. The respective low alloy sintered steels thus obtained were subjected to measurement of mean grain sizes of prior austenite ($\gamma$) crystal grains, maximum diameters of pores and inclusions in areas of 400 mm$^2$, transverse rupture strength values and fatigue strength values. Table 1 shows the results of the measurements. The fatigue strength values were obtained by a rotary bending test using smoothed test pieces, while the transverse rupture strength values were obtained using smoothed test pieces of 4 mm×9 mm×45 mm in size.

TABLE 1

| Sample | Treatment Time (hr) | Prior γ Grain Size (μm) | Maximum Diameter of Inclusion (μm) | Transverse Rupture Strength (kg/mm$^2$) | Fatigue Strength (kg/mm$^2$) |
|---|---|---|---|---|---|
| 1 | 2 | 18.7 | 186 | 220 | 80 |
| 2 | 3 | 15.0 | 48 | 230 | 85 |
| 3 | 4 | 12.6 | 47 | 244 | 90 |
| 4 | 20 | 10.4 | 33 | 261 | 95 |
| 5 | 40 | 8.8 | 25 | 277 | 100 |
| 6 | 80 | 8.2 | 27 | 273 | 100 |

It is understood from the results of Table 1 that the mean grain sizes of the prior austenite crystal grains and the sizes of the maximum inclusions were reduced as the times for treating the raw material powder with the dry mill were increased. The characteristics of the low alloy sintered steels were improved in response, to provide low alloy sintered steels having fatigue strength values of at least 85 kg/mm$^2$ in particular.

EXAMPLE 2

Commercially available iron alloy powder materials prepared by a water atomizing process to have AISI4600 compositions (Fe—1.8 wt. % Ni—0.5 wt. % Mo) were treated with a high energy dry mill in an argon atmosphere for 40 hours. Each of the obtained treated powder materials was heated in a nitrogen atmosphere at a temperature of 800° C. for 1 hour to be annealed and thus softened. Thereafter graphite powder was added and mixed to the treated powder so that the carbon content was 0.25 percent by weight in the final composition. This mixed powder was cold-formed by a die press so that the green density was 6.9 g/cm$^3$ (density ratio of 0.878). Thereafter the compacts were sintered in nitrogen at a temperature of 1150° C. for 1 hour, and further forged at this temperature, so that the density ratios after forging were within a range of 0.92 to 0.99.

The forged bodies having different density ratios were heat treated similarly to Example 1, and the mean grain sizes of prior austenite (γ) crystal grains, transverse rupture strength values, impact values where measured and fatigue strength values. Table 2 shows the results of the measurements. The respective low alloy sintered steels contained pores and inclusions of not more than 50 μm in maximum diameter. For the purpose of comparison, a low alloy sintered steel was prepared in a similar manner to the above except that raw material powder was not treated with a dry mill, and was then subjected to the same evaluation as the above. Table 2 also shows the results.

TABLE 2

| Sample | Density Ratio | Prior γ Grain Size (μm) | Transverse Rupture Strength (kg/mm$^2$) | Impact Value (kgf.m/cm$^2$) | Fatigue Strength (kg/mm$^2$) |
|---|---|---|---|---|---|
| 7 | 0.92 | 8.8 | 202 | 0.66 | 70 |
| 8 | 0.94 | 8.9 | 221 | 0.92 | 75 |
| 9 | 0.96 | 8.8 | 248 | 1.4 | 85 |
| 10 | 0.99 | 8.7 | 277 | 3.2 | 100 |
| Comparative Material | 0.99 | 22.4 | 210 | 1.72 | 75 |

It is understood from the results shown in Table 2 that all of the strength, toughness (impact value) and fatigue strength values of the low alloy sintered steels were increased as the density ratios were increased. When the density ratios reached 0.96, low alloy sintered steels having fatigue strength values of at least 85 kg/mm$^2$ were obtained. In the comparative material prepared without step of treating the raw material powder with a dry mill, however, the strength and fatigue strength values were inferior to those of the inventive low alloy sintered steels due to a large mean grain size of prior austenite crystal grains, even if a high density ratio was achieved.

EXAMPLE 3

Commercially available iron alloy powder materials prepared by a water atomizing process to have AISI4600 compositions (Fe—1.8 wt. % Ni—0.5 wt. % Mo) were blended and mixed with alumina powder materials 0.05 μm in mean particle size so that volume fractions of the alumina powder materials were 0.5, 1.0, 2.0 and 5.0 percent respectively. Thereafter each of the mixed powder materials was treated with a high energy dry mill in an argon atmosphere for 40 hours. Each of the treated powder materials was annealed and softened, mixed with graphite powder, cold-formed, sintered, forged to have a density ratio of at least 0.99 and heat treated under the same conditions as Example 1, to prepare a low alloy sintered steel.

The respective low alloy sintered steels were then subjected to measurement of mean grain sizes of prior austenite crystal grains, transverse rupture strength values, impact values and fatigue strength values. Table 3 shows the results of the measurements. Pores and inclusions contained in the respective low alloy sintered steels were not more than 50 μm in maximum diameter.

TABLE 3

| Sample | Al$_2$O$_3$ Content (vol %) | Prior γ Grain Size (μm) | Transverse Rupture Strength (kg/mm$^2$) | Impact Value (kgf.m/cm$^2$) | Fatigue Strength (kg/mm$^2$) |
|---|---|---|---|---|---|
| 11 | 0.5 | 7.8 | 279 | 3.4 | 100 |
| 12 | 1.0 | 4.8 | 330 | 6.1 | 120 |
| 13 | 2.0 | 2.9 | 338 | 6.7 | 120 |
| 14 | 5.0 | 2.5 | 342 | 5.9 | 120 |

It is understood from the results shown in Table 3 that prior austenite crystal grains were refined by the addition of alumina. It is also understood that the effect of such refinement was stopped and the impact value (toughness) was reduced when the amount of alumina exceeded 5 percent by volume.

EXAMPLE 4

Alumina powder materials having mean particle sizes of 0.05, 0.1, 0.5, 5, 15 and 24 μm were blended and mixed with commercially available iron alloy powder materials prepared by a water atomizing process to have AISI4600 compositions (Fe—1.8 wt. % Ni—0.5 wt. % Mo) so that volume fractions of the alumina powder materials were 1.0 percent. Thereafter each of the mixed powder materials was treated with a high energy dry mill in an argon atmosphere for 40 hours. Each of the obtained treated powder materials was annealed and softened, mixed with graphite powder, cold-formed, sintered, forged to have a density ratio of at least 0.99, and heat treated under the same conditions as Example 1, to prepare a low alloy sintered steel.

The respective low alloy sintered steels were then subjected to measurement of mean grain sizes of prior austenite (γ) crystal grains, transverse rupture strength values, impact values and fatigue strength values. Table 4 shows the results of the measurements.

TABLE 4

| Sample | Al$_2$O$_3$ Particle Size (μm) | Prior γ Grain Size (μm) | Transverse Rupture Strength (kg/mm$^2$) | Impact Value (kgf.m/cm$^2$) | Fatigue Strength (kg/mm$^2$) |
|---|---|---|---|---|---|
| 15 | 0.05 | 4.8 | 330 | 6.1 | 120 |
| 16 | 0.1 | 6.2 | 315 | 4.4 | 120 |
| 17 | 0.5 | 10.8 | 272 | 3.2 | 115 |
| 18 | 5 | 14.2 | 232 | 2.0 | 80 |
| 19 | 15 | 17.3 | 218 | 1.8 | 78 |
| 20 | 24 | 22.2 | 212 | 1.6 | 75 |

It is understood from the results shown in Table 4 that prior austenite crystal grains contained in the low alloy sintered steels were refined and that fatigue strength values exceeding 85 kg/mm$^2$ were attained by adding alumina powder of not more than 0.5 μm in mean particle size. It is also understood that the effect of such refinement of the prior austenite crystal grains could not be attained but instead of alumina functioned as a defect with a tendency of reducing the strength and toughness when the mean particle sizes of the added alumina powder exceeded 5 μm.

EXAMPLE 5

Ferroniobium powder, titanium powder, ferrovanadium powder, tungsten powder and ferroaluminum powder serving as niobium, titanium, vanadium, tungsten and aluminum sources were added and mixed with commercially available iron alloy powder materials prepared by a water atomizing process to have AISI4100 compositions (Fe—0.8 wt. % Mn—1.0 wt. % Cr—0.25 wt. % Mo) so that the respective contents thereof were 0.5 percent by weight in final compositions. Then the powder materials were treated with a high energy dry mill in an argon atmosphere for 40 hours.

Each of the treated powder materials was heated in a nitrogen atmosphere at a temperature of 800° C. for 1 hour, to be annealed and softened. Thereafter graphite powder was added and mixed with each treated powder material so that the carbon content was 0.2 percent by weight in the final composition. Each mixed powder was cold-formed, sintered and forged similarly to Example 1, to obtain a forged body having a density ratio of at least 0.99 after forging. Each forged body was gas-carburized so that an effective case depth was 1 mm, thereafter heated at a temperature of 850° C., quenched in oil, and then tempered at a temperature of 200° C. for 90 minutes.

The respective low alloy sintered steels were subjected to measurement of mean grain sizes of prior austenite (γ) crystal grains, transverse rupture strength values, impact values and fatigue strength values. Table 5 shows the results of the measurements. The respective low alloy sintered steels contained pores and inclusions of not more than 50 μm in maximum diameter.

TABLE 5

| Sample | Added Element | Prior γ Grain Size (μm) | Transverse Rupture Strength (kg/mm$^2$) | Impact Value (kgf.m/cm$^2$) | Fatigue Strength (kg/mm$^2$) |
|---|---|---|---|---|---|
| 21 | None | 8.8 | 277 | 3.2 | 100 |
| 22 | Nb | 6.2 | 321 | 4.9 | 120 |
| 23 | Ti | 7.7 | 318 | 4.9 | 115 |
| 24 | V | 6.5 | 310 | 4.8 | 120 |
| 25 | W | 7.2 | 316 | 5.1 | 120 |
| 26 | Al | 6.3 | 319 | 5.0 | 118 |

It is understood from the results shown in Table 5 that refinement of prior austenite crystal grains was facilitated by the addition of niobium, titanium, vanadium, tungsten and aluminum, so that the low alloy sintered steels were further improved in strength and toughness (impact value) as compared with that containing no such added element.

EXAMPLE 6

1 percent by volume of alumina powder having a mean particle size of 0.05 μm was mixed with a commercially available iron alloy powder material prepared by a water atomizing process to have an AISI4600 composition (Fe— 1.8 wt. % Ni—0.5 wt. % Mo). Thereafter each of the mixed powder materials was treated with a high energy dry mill in an argon atmosphere for 40 hours. Each of the treated powder materials was annealed and softened under the same conditions as Example 1, and then mixed with graphite powder and ferroboron powder so that the carbon content was 0.25 percent by weight and the boron content was 30 ppm in weight fraction in the final composition. This mixed powder material was cold-formed, sintered and forged, to obtain a forged body having a density ratio at least 0.99.

A round bar of 25.4 mm in diameter by 101.6 mm in length (1 inch in diameter by 4 inches in length) was cut from the forged body, and subjected to a Jominy test for evaluating its hardenability. For the purpose of comparison, round bars of the same shapes as the above were cut from the forged body (sample No. 12), which was prepared in Example 3 to contain 1.0 percent by volume of alumina and no boron, and an SCM420 steel material, and also subjected to a comparative evaluation of hardenability. FIG. 1 shows the results. It is understood from FIG. 1 that the hardenability of the inventive material (sample No. 12) containing no B (boron) was reduced by refinement of prior austenite crystal grains. It is also understood that the hardenability of the inventive material containing B (boron) according to this Example was remarkably improved to a level substantially equivalent to that of the SCM420 steel material.

EXAMPLE 7

1 percent by volume of alumina powder having a mean particle size of 0.05 μm was mixed with commercially available iron alloy powder prepared by a water atomizing process to have an AISI4600 composition (Fe—1.8 wt. % Ni—0.5 wt. % Mo). Thereafter the mixed powder was treated with a high energy dry mill in an argon atmosphere for 40 hours. The treated powder was annealed and softened in a vacuum at a temperature of 1000° C. for 1 hour, and thereafter mixed with graphite powder so that the carbon content was 0.25 percent by weight in the final composition. This mixed powder was cold-formed in a similar manner to Example 1, to prepare a compact having a part shape of a one-way clutch.

The compact was sintered, forged and heat-treated similarly to Example 1, and thereafter machined by polishing and the like into an outer race and a sprag of a one-way clutch for use in an automatic transmission of an automobile. For the purpose of comparison, the same outer race and sprag were prepared from a similarly heat-treated SCM420 material. The outer races and the sprags of the inventive and comparative materials were used for assembling clutches, which were then subjected to a stroking test. The test conditions were as follows:

Stroking Test Conditions
Load Torque: 600 N·m
Rocking Speed: 600 cpm
Oil Feed Temperature: 120°±5° C.
Lubricating Method: Oil Bath
Lubricating Oil: AT Oil
Inner Race: Material: SUJ2
   Heat Treatment: Quench-and-Temper
   Hardness: HRC61 to 63

Figure 2:
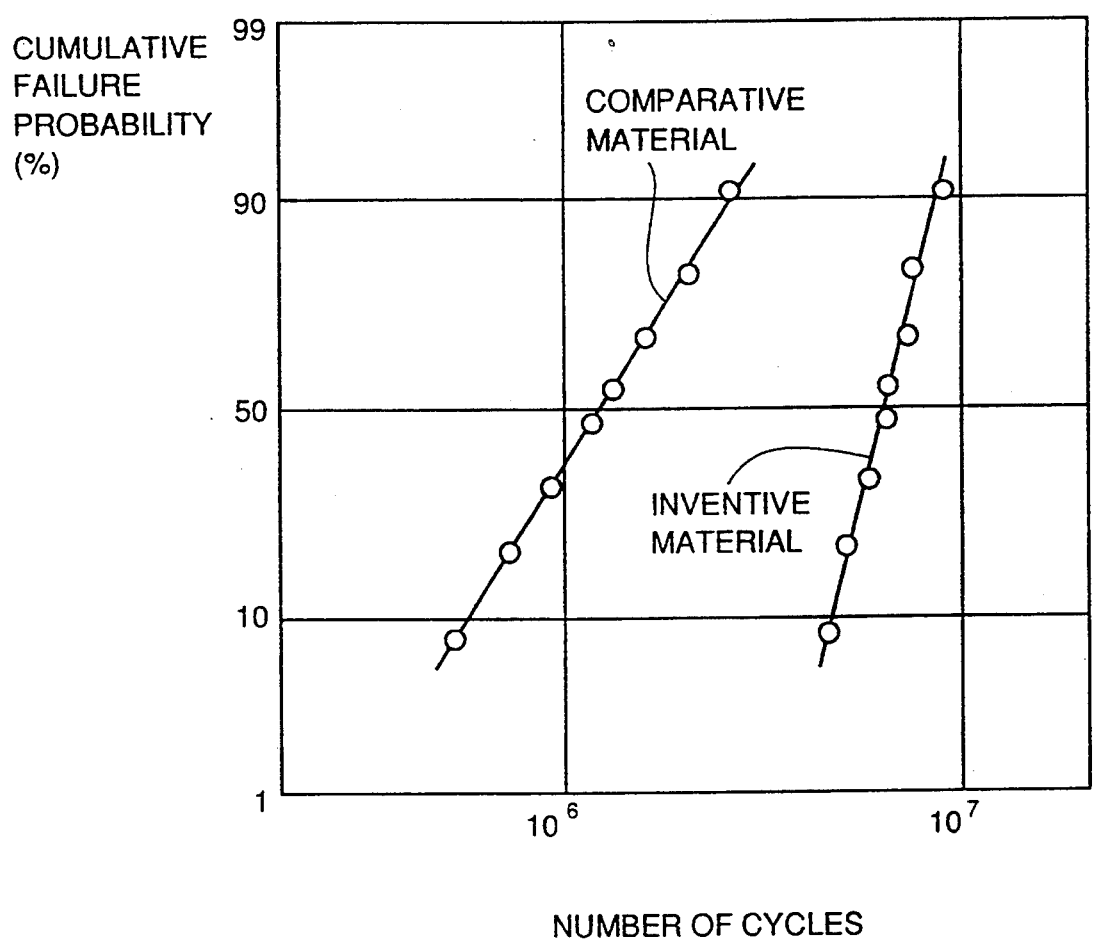
FIG. 2 is a graph showing cumulative failure probabilities due to flaking and the like, indicating a working life of clutch outer races prepared from an inventive material and a comparative SCM420 steel material relative to the number of strokes cycles in a clutch stroking test.
Figure 3:
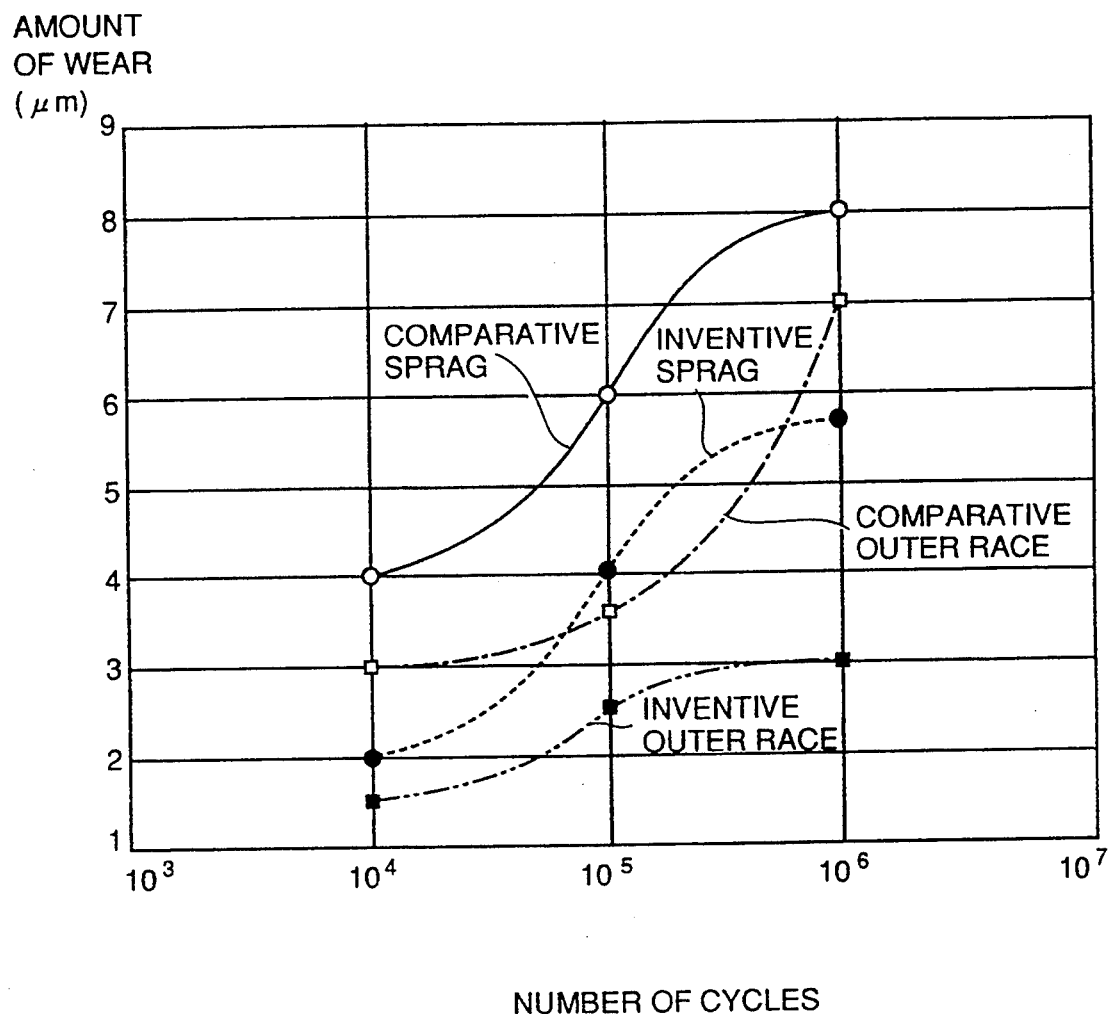
FIG. 3 is a graph showing the amount of wear, i.e. indicating the wear resistance of the outer races and the sprags prepared from the inventive material and the comparative SCM420 steel material.

FIG. 2 shows cumulative failure probabilities caused by flaking and the like as to the outer races of the inventive and comparative materials, as the results of the aforementioned endurance test. It is understood from FIG. 2 that the inventive material is superior in working life with respect to flaking and the like, relative to the comparative material of the conventional SCM420 carburized steel material. In the aforementioned endurance test, further, wear rates of the outer races and the sprags were measured at $10^4$, $10^5$ and $10^6$ cycles respectively. FIG. 3 shows the results. It is understood from FIG. 3 that the inventive material was superior in wear resistance to the comparative material of the conventional SCM420 carburized steel material.

According to the present invention, as hereinabove described, it is possible to provide a low alloy sintered steel which is excellent not only in static characteristics such as transverse rupture strength but also in dynamic characteristics such as fatigue strength and impact value toughness.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A low alloy sintered steel containing at least 0.15 percent by weight and less than 0.8 percent by weight of carbon and having a matrix of a tempered martensite containing prior austenite crystal grains of not more than 15 μm in mean grain size, said matrix containing pores and nonmetallic inclusions of not more than 50 μm in maximum diameter, and having a density of at least 96 percent of theoretical density.

2. The low alloy sintered steel in accordance with claim 1, further comprising particles of at least one component selected from the group consisting of oxides, nitrides and carbides, homogeneously dispersed in said matrix, wherein said particles have a mean particle size not more than 0.5 μm, and wherein said particles have no more than a low solid solubility in an austenite phase of said matrix.

3. The low alloy sintered steel in accordance with claim 1, further containing at least 10 ppm and not more than 300 ppm by weight of boron.

4. The low alloy sintered steel in accordance with claim 1, further containing at least one element selected from the group consisting of niobium, vanadium, titanium, tungsten and aluminum in an amount of at least 0.05 percent by weight and not more than 3.0 percent by weight in total.

5. The low alloy sintered steel in accordance with claim 1, further containing at least 0.5 percent by weight and not more than 3 percent by weight of nickel and at least 0.1 percent by weight and not more than 1.5 percent by weight of molybdenum.

6. The low alloy sintered steel in accordance with claim 1, further containing at least 0.5 percent by weight and not more than 3 percent by weight of chromium, at least 0.1 percent by weight and not more than 1.5 percent by weight of molybdenum, and at least 0.2 percent by weight and not more than 1.6 percent by weight of manganese.

7. A method of preparing a low alloy sintered steel, comprising the following steps:

treating a raw material powder containing at least one of atomized iron powder and atomized iron alloy powder and containing nonmetallic inclusions in a treatment atmosphere containing one of an inert gas and atmospheric air with a dry mill for introducing dislocations into said raw material powder and pulverizing said nonmetallic inclusions to a maximum diameter of not more than 50 μm;

annealing said treated raw material powder for softening said treated raw material powder;

adding and mixing carbon powder with said annealed raw material powder to obtain a mixed powder with a carbon content of at least 0.15 percent by weight and less than 0.8 percent by weight in the final composition;

cold-forming said mixed powder to obtain a compact;

densifying said compact to a density of at least 96 percent of theoretical density by one of sintering and hot plastic working; and heat treating said densified compact to obtain a low alloy sintered steel having a matrix of a tempered martensite.

8. The method of preparing a low alloy sintered steel in accordance with claim 7, further comprising an additional step before said step of treating said raw material powder with a dry mill, said additional step comprising adding and mixing with said raw material powder particles of at least one component selected from the group consisting of oxides, nitrides and carbides, wherein said particles have a mean particle size not more than 0.5 μm, and wherein said particles have no more than a low solid solubility in an austenite phase.

9. The method of preparing a low alloy sintered steel in accordance with claim 8, wherein said particles are added to said raw material powder to have a volume fraction of at least 0.5 percent and not more than 5 percent with respect to the total volume of said treated powder.

10. The method of preparing a low alloy sintered steel in accordance with claim 8, wherein
said added particles are alumina particles.

11. The method of preparing a low alloy sintered steel in accordance with claim 7, further comprising an additional step before said step of treating said raw material powder with a dry mill, said additional step comprising adding and mixing at least one element selected from the group consisting of niobium, vanadium, titanium, tungsten and aluminum to said raw material powder to have a content of at least 0.05 percent and not more than 3 percent by weight in total.

12. The method of preparing a low alloy sintered steel in accordance with claim 7, wherein said step of annealing said treated raw material powder is carried out in a vacuum or a non-oxidizing atmosphere at a temperature of at least 600° C. and not more than 1000° C.

13. The method of preparing a low alloy sintered steel in accordance with claim 7, further comprising a step of adding and mixing ferroboron powder with said annealed raw material powder to attain a boron weight fraction of at least 10 ppm and not more than 300 ppm.

14. The low alloy sintered steel in accordance with claim 1, containing at least 0.15 percent by weight and not more than 0.7 percent by weight of carbon.

15. The low alloy sintered steel in accordance with claim 2, wherein said particles are not in solid solution in said austenite phase.

16. The method of preparing a low alloy sintered steel in accordance with claim 7, wherein said step of adding and mixing carbon powder is carried out to attain a carbon content of at least 0.15 percent by weight and not more than 0.7 percent by weight in said final composition.

17. The method of preparing a low alloy sintered steel in accordance with claim 8, wherein said particles added in said additional step are not in solid solution in said austenite phase.

* * * * *